Dec. 15, 1925.  1,565,504
H. H. RUDD ET AL.
MEASURING DEVICE
Filed Aug. 26, 1918

WITNESSES:
Fred C. Wilharm
J. A. Procter

INVENTORS
Harold H. Rudd
Allan P. Bender
BY
Wesley G. Carr
ATTORNEY

Patented Dec. 15, 1925.

1,565,504

UNITED STATES PATENT OFFICE.

HAROLD H. RUDD, OF EDGEWOOD, AND ALLAN P. BENDER, OF WILKINSBURG, PENNSYLVANIA, ASSIGNORS TO WESTINGHOUSE ELECTRIC & MANUFACTURING COMPANY, A CORPORATION OF PENNSYLVANIA.

MEASURING DEVICE.

Application filed August 26, 1918. Serial No. 251,392.

*To all whom it may concern:*

Be it known that we HAROLD H. RUDD, a citizen of the United States, and a resident of Edgewood, in the county of Allegheny and State of Pennsylvania, and ALLAN P. BENDER, a citizen of the United States, and a resident of Wilkinsburg, in the county of Allegheny and State of Pennsylvania, have invented a new and useful Improvement in Measuring Devices, of which the following is a specification.

Our invention relates to measuring devices and particularly to means for indicating the temperature of translating devices.

One object of our invention is to provide a device for indicating the mean temperature of the windings of a translating device.

Another object of our invention is to provide a temperature-indicating device, of the above indicated character, that shall be inductively related to the translating device.

A further object of our invention is to provide an indicating device of the above indicated character that shall be simple and inexpensive to construct and effective in its operation.

In practicing our invention, we provide a winding that is inductively associated with, and subjected to the temperature of, the transformer or other translating device, the temperature of which is to be determined. A second winding having a relatively low or zero temperature coefficient is similarly associated with the transformer. Means, such as an electro responsive device, is provided for indicating temperature in accordance with the difference in the current traversing the two windings. Since the numbers of turns and the normal resistances of the windings are equal, the difference in current traversing the same is proportional to the change in resistance of one of the windings, and, since the resistance of the winding varies with the temperature to which it is subjected, the difference in current traversing the windings is an indication of the temperature of the transformer.

Figure 1:
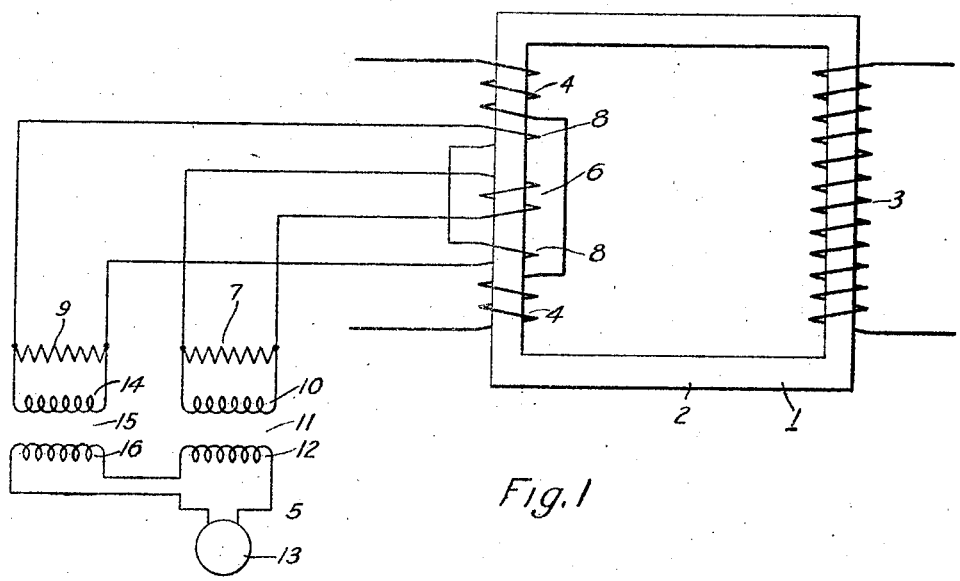
Figure 2:
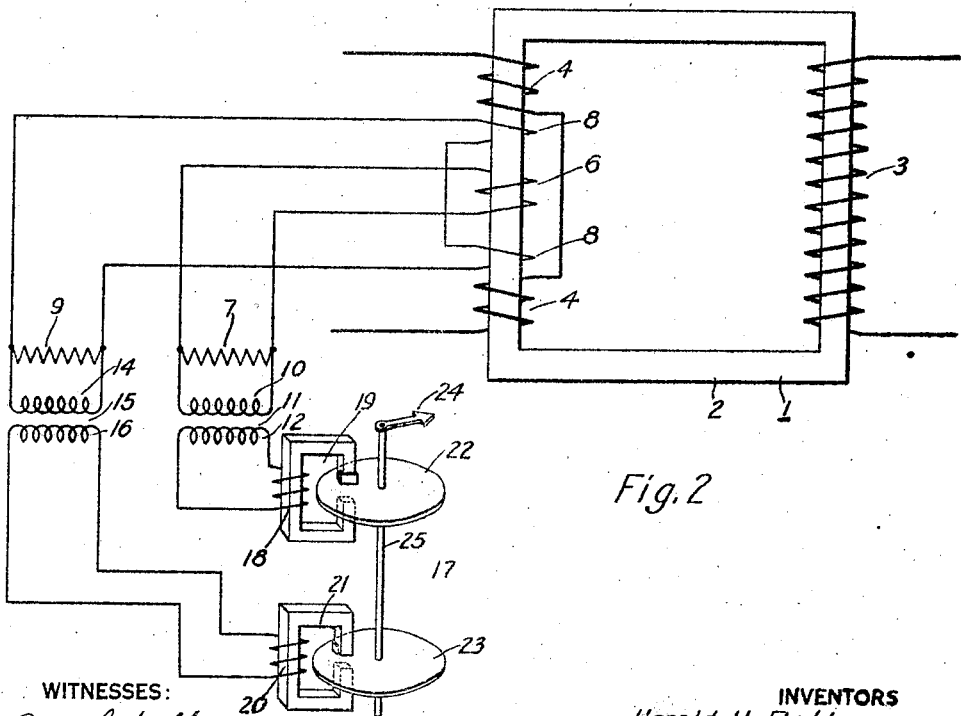

Fig. 1 of the accompanying drawings is a diagrammatic view of a temperature-measuring device embodying our invention, and Fig. 2 is a diagrammatic view of a modified form of temperature-measuring device embodying our invention.

A transformer 1, comprising a magnetizable core member 2, a primary winding 3 and a secondary winding 4, is provided with a temperature-measuring device 5 that is adapted to indicate the actual temperature to which the windings 3 and 4 of the transformer are subjected.

A winding 6, having a relatively high temperature coefficient, is disposed around the core member 2 between the two portions of the secondary winding 4. The winding 6 is inductively associated with the windings 3 and 4 and is connected in series with a resistor 7. A two-part winding 8 is disposed in inductive relation to the windings of the transformer 1, the two parts of which are distributed with respect to the winding 6. The winding 8 is of the same number of turns as the winding 6 and is formed of material having a relatively low or even zero temperature coefficient. The winding 8 is connected in series with a resistor 9. The windings 6 and 8 are so wound, with respect to the transformer 1, that the voltages induced therein are in opposition to one another.

The primary winding 10 of a transformer 11 is operatively connected across the resistor 7, and the secondary winding 12 is connected to a voltage-measuring instrument 13. Similarly, the primary winding 14 of the transformer 15 is connected across the resistor 9, and the secondary winding 16 is connected in series with the secondary 12 of the transformer 11. By this arrangement, the measuring instrument 13 is adapted to indicate the difference in potential drop across the resistors 7 and 9.

Since the windings 6 and 8 are of the same number of turns and, since they are adapted to oppose one another, the difference in current traversing the same will be caused only by a change in resistance in the windings. However, since the resistance of the winding 6 varies in accordance with the temperature to which it is subjected the difference in currents traversing the resistors 7 and 9 and, consequently the indication of the instrument 13 will be an indication of the temperature of the transformer 1.

In Fig. 2 of the drawings, like reference numerals refer to similar parts of the device shown in Fig. 1. In this device, the potential drop across the resistors 7 and 9 is adapted to be indicated by a differential measuring instrument 17. That is, the secondary winding 12 of the transformer 11 is connected to the actuating winding 18 of one element 19 of the meter 17 and the secondary winding 16 of the transformer 15 is connected to the actuating winding 20 of another element 21 of the meter. The windings 18 and 20 are adapted to actuate their respective armatures 22 and 23 in opposite directions, thereby causing a pointer 24, that is mounted on a shaft 25 upon which the armatures 22 and 23 are also mounted to indicate the difference in the currents traversing the windings 6 and 8. The armatures are provided with the usual forms of controlling devices (not shown) to preclude rotation thereof.

It will be understood that the same result may be obtained by disposing the windings 6 and 8 in the same direction on the core member 2 and connecting the same to oppose each other. However, in order that the reactance effect of the two windings be identical, it is essential that an even and equal number of turns of the windings 6 and 8 be transposed at the middle of the same. This will equalize the effect of transformer reactance or leakage, in so far as the windings 6 and 8 are concerned.

Our invention is not limited to the specific devices illustrated, as it may be variously modified without departing from the spirit and scope of the invention as set forth in the claims.

We claim as our invention:

1. A temperature-measuring device for a transformer comprising an exploring winding having a relatively high temperature coefficient, an exploring winding having a relatively low temperature coefficient, said windings being inductively and thermally associated with the transformer, means for causing the currents traversing the windings to exert opposing effects, and means for indicating the resultant of said effects.

2. A temperature-measuring device for a transformer comprising a winding inductively related to the transformer, a second winding having zero temperature co-efficient also inductively related to the transformer, and means for indicating the difference in the currents traversing the windings.

3. A temperature-measuring device for a transformer comprising two windings having different temperature coefficients inductively associated with, and subjected to, the temperature of the transformer, and electrical means connected to the windings for indicating the difference in current traversing the same.

4. A temperature-measuring device for a translating device comprising two windings having different temperature coefficients, said windings being inductively associated with, and subjected to, the temperature of the translating device, and means connected to the windings for indicating the difference in current traversing the same.

5. A temperature-measuring device for a translating device comprising a winding, a second winding having a relatively low temperature coefficient, said windings being inductively and thermally associated with the device, and means connected to the windings for indicating the difference in current traversing the windings.

6. A temperature-measuring device for a translating device comprising a winding, a second winding having a relatively low temperature coefficient, said windings being inductively associated with, and subjected to the temperature of, the translating device, and an electro-responsive device for indicating the difference in current traversing the windings.

In testimony whereof, we have hereunto subscribed our names.

HAROLD H. RUDD.
ALLAN P. BENDER.